United States Patent [19]
Osato et al.

[11] Patent Number: 4,675,767
[45] Date of Patent: Jun. 23, 1987

[54] OPTO-MAGNETIC RECORDING MEDIUM

[75] Inventors: Yoichi Osato, Yokohama; Ichiro Saito, Kawasaki; Kozo Arao, Yokohama; Eiichi Fujii, Tokyo; Yoshio Takasu, Tama, all of Japan

[73] Assignee: Canon Kabushiki Kaisha, Tokyo, Japan

[21] Appl. No.: 679,314

[22] Filed: Dec. 7, 1984

[30] Foreign Application Priority Data

Dec. 12, 1983 [JP] Japan .............................. 58-232658
Nov. 29, 1984 [JP] Japan .............................. 59-252606

[51] Int. Cl.⁴ .......................... G11B 5/74; G11B 5/32
[52] U.S. Cl. .................................. 360/131; 360/134; 360/114
[58] Field of Search ...................... 360/131, 134–135, 360/114; 428/900, 928; 369/275–276

[56] References Cited

U.S. PATENT DOCUMENTS 4,467,383 8/1984 Ohta et al. .......................... 360/131
4,569,881 2/1986 Freese et al. .................. 360/131 X Primary Examiner—John H. Wolff
Attorney, Agent, or Firm—Fitzpatrick, Cella, Harper & Scinto

[57] ABSTRACT

There is disclosed a magnetooptical recording medium, which is provided with a recording layer composed of a magnetic layer having an easy axis of magnetization perpendicular to the surface of recording layer, and a reflective layer positioned adjacent to the recording layer and composed of a mixture of a substance of a low absorbance to the light of a determined wavelength and a substance of a high reflectivity to the above-mentioned light.

11 Claims, 5 Drawing Figures

OPTO-MAGNETIC RECORDING MEDIUM

BACKGROUND OF THE INVENTION

1. Field of the Invention

The present invention relates to an opto-magnetic recording medium used for an opto-magnetic memory, a magnetic recording device or a display device and from which information is read-out by utilizing a magneto-optical effect such as magnetic Kerr effect or Faraday effect.

2. Description of the Prior Art

There have been conducted developments for optical memories in which information recorded in various recording medium is optically read, and such memories are attracting much attention for application in high-density large-capacity information storage as the result of recent progress in the laser and optical elements. Among such recording medium there is known so-called opto-magnetic recording medium in which magnetically recorded information is read by utilizing a magneto-optical effect. Such magneto optical recording medium is provided, as a recording layer, with a magnetic layer having characteristic in which the layer is easily magnetized in a direction perpendicular to the layer surface. The information recording is for example, achieved by magnetizing said recording layer in one direction and partially heating said layer with a laser beam spot to invert the direction of magnetization in said heated spot. The information can be read optically from such information bearing medium by means of the magnetic Kerr effect or Faraday effect. Also the recorded information can be erased by partial or total heating of the medium in an externally applied magnetic field. The magnetic recording layer was originally composed of a polycrystalline thin layer such as MnBi, but recently investigated are amorphous alloy thin layers of transition metals (Fe, Co, Ni etc.) and rare earth metals (Tb, Dy, Gd, Ho etc.) represented by a ternary alloy GdTbFe, in order to achieve magnetically uniform film formation, a suitable information recording temperature and a large magneto-optical effect.

On the other hand, such opto-magnetic recording medium are associated with a drawback of a low level of the reproduced signal. Particularly in the signal reproduction through the Kerr Effect, it has been difficult to increase the signal-to-noise (S/N) ratio because of a small Kerr rotation angle. For this reason, there have been made various proposals for increasing said Kerr rotation angle through the improvement of the magnetic material constituting the recording layer, or formation of a dielectric layer of SiO or $SiO_2$ on the recording medium to utilize the multiple reflection on the recording layer.

Also, as disclosed in the Japanese Patent laid-open Nos. 6541/1983 and 6542/1983, it is proposed to utilize a sufficiently thin magnetic recording layer with a reflective metal layer on the back side, thereby obtaining a large reproduced signal through the combination of Kerr effect and Faraday effect. FIG. 2 shows an example of such recording medium, comprising a translucent substrate 21, a magnetic recording layer 22, a reflective metal layer 23 and a protective layer 24. It is also reported (J. Appl. Phys., Vol. 53, No. 6, p. 4485–4494) that an even higher S/N ratio can be obtained, in a recording medium having a transparent dielectric layer between the magnetic recording layer and the reflective metal layer as shown in FIG. 3, by the suitable selection of materials and thicknesses of said three layers. In FIG. 3, there are shown a translucent substrate 31, a magnetic recording layer 32, a transparent dielectric layer 33, a reflective metal layer 34 and protective layer 35. Said transparent dielectric layer 33 functions to generate a phase difference between the light reflected at the interface between the amorphous magnetic layer 32 and the translucent opto-magnetic substrate 31, and the light reflected by the reflective metal layer 34 and reaching said-interface, thereby reducing the reflectivity of the media and apparently increasing the angle of rotation of the plane of polarization by the magneto-optical effect.

However such conventional opto-magnetic recording media have been associated with a drawback of being easily oxidized since the reflective layer is composed of a thin metal layer of a thickness of 100–600 Å. The oxidation of the reflective layer leads to a lowered recording sensitivity, an increase of errors and signal deterioration in the signal readout, and eventually gives rise to an inclination for oxidation of the recording layer. Also it is difficult to achieve a high S/N ratio by means of the above-explained transparent dielectric layer, since a uniform layer thickness cannot be reproduced precisely.

SUMMARY OF THE INVENTION

An object of the present invention is to provide an opto-magnetic recording medium which is capable of providing a high S/N ratio in the reproduced signal and is stable in storage.

Another object of the present invention is to provide an opto-magnetic recording medium which is capable of providing a high S/N ratio in the reproduced signal and is easy to prepare.

The foregoing objects can be achieved according to the present invention by an opto-magnetic recording medium comprising a recording layer composed of a magnetic layer having characteristic in which the layer is easily magnetized in a direction perpendicular to the layer surface and a reflective layer which is composed of a mixture of a substance of a low absorbance to the light of a determined wave-length and a substance of a high reflectivity to said light, and is provided on said recording layer.

DETAILED DESCRIPTION OF THE PREFERRED EMBODIMENTS

Figure 1:
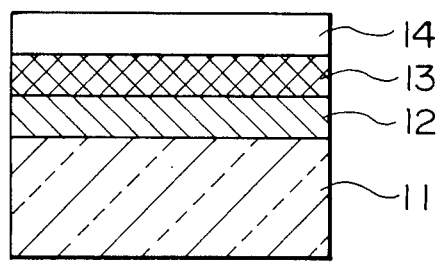
FIG. 1 is a schematic cross-sectional view of the opto-magnetic recording medium embodying the present invention.
Figure 2:
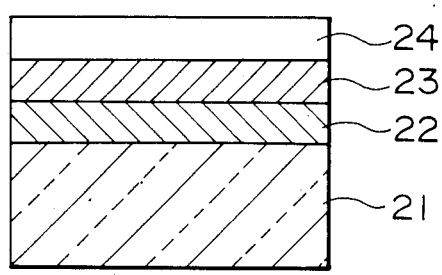
FIG. 2 is a schematic cross-sectional view showing an example of conventional opto-magnetic recording medium.
Figure 3:
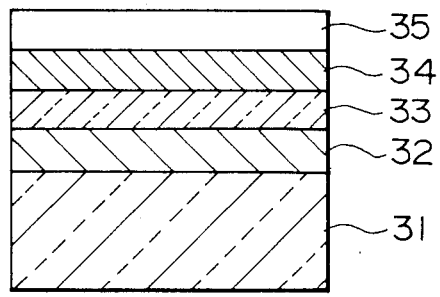
FIG. 3 is a schematic cross-sectional view showing another example of conventional opto-magnetic recording medium.

FIG. 1 shows an embodiment of the opto-magnetic recording medium according to the present invention, in which provided are a translucent substrate 11, a magnetic recording layer 12, a reflective layer 13 and a protective layer 14. The translucent substrate 11 is made, for example, of glass or a plastic material. The magnetic recording layer 12 is composed of a magnetic layer having a characteristic in which the layer is easily magnetized in a direction perpendicular to the layer surface. Such magnetic layer is preferably made of a rare earth-transition metal amorphous alloy with a large Kerr rotation angle such as GdTbFe, TbDyFe, GdDyFe, GdTbFeCo etc. The information magnetically stored in the magnetic recording layer 12 can be read, by means of a magneto-optical effect, by irradiating a reproducing light beam through the translucent substrate 11. The reproducing light beam is modulated by the rotation of the plane of polarization according to said information, and said rotation is converted, by means for example of a polarizer, into a change in the amount of light, thus reproducing said information.

The reflective layer 13 is composed of a mixture of a material of a low absorbance to the wavelength of said reproducing light beam and a material of a high reflectivity to said wavelength. Because of said composition, the reflective layer 13 performs a reflective function and a phase modulating function simultaneously. Consequently the reproducing light beam subjected to Faraday rotation in passing the magnetic recording layer 12 is again subjected, after reflection by the reflective layer 13, to Faraday rotation in the magnetic recording layer 12, thus providing a high S/N ratio due to the increase in the angle of rotation of the plane of polarization. In contrast to the ordinary metal reflective layer which reflects a linearly polarized light as a linearly polarized light, the reflective layer 13 composed of the above-mentioned mixture reflects a linearly polarized incident light as an ovally polarized light, so that an even higher S/N ratio can be obtained by means of an optimum positioning of the analyzer through a phase plate.

The material of low absorbance constituting said reflective layer 13 is composed, for the reproducing light beam of ordinary wavelengths such as laser beam, of oxide, fluoride, sulfide or iodide of metal or semi-metal, or an organic polymer. Further there may be employed for this purpose any material capable of substantially transmitting the reproducing light beam, but in practice it is preferable that the imaginary part of the refractive index is smaller than 0.01 in the wavelength range of the reproducing light beam. Also the substance of high reflectivity constituting the reflective layer 13 is preferably provided with a reflectance at least equal to 80% in the wavelength range of the reproducing light beam. Examples of such substance are metals such as Cu, Ag, Au, Al etc. The reflective layer 13, composed of the above-explained substances, having a structure of metal dispersion in the aforementioned dielectric substance, is less easily oxidized and is more stable in storage in comparison with the conventional metal reflective layer.

The composition of said low-absorbing material ($M_{II}$) and high-reflecting material ($M_I$) varies according to the wavelength of the reproducing light beam and the materials employed, but in general the high-reflecting substance preferably represents 80-95 atomic % of the entire mixture ($0.80 \leq x \leq 0.95$ for a composition $M_{Ix}$-$M_{II1-x}$ of the reflective layer). A percentage lower than 80 atom. % will lead to an insufficient reflectivity, while a percentage higher than 95 atom. % will give rise to an insufficient life of storage. The thickness of the reflective layer 13 is preferably in a range of 700 to 3,000 Å, though it varies according to the constituent substances or the composition thereof. Also the thickness of the magnetic recording layer 12 in the presence of such reflective layer 13 is preferably in a range of 100 to 1,000 Å in order to obtain a sufficiently high optical transmission.

The reflective layer 13 can be prepared in various methods, but the aforementioned mixture of dielectric material and metal is preferably deposited simultaneously for example by sputtering, electron beam evaporation or resistance-heated evaporation. The phase difference of the reproducing light beam reflected by the reflective layer 13 is mostly determined by the composition of the mixture constituting said reflective layer 13. As such composition can be controlled very precisely, a desired phase difference can be easily attained in the opto-magnetic recording medium, in comparison with the conventional case of controlling the thickness of transparent dielectric layer.

The protective layer 14 shown in FIG. 1 protects the reflective layer 13 from scars, dusts, humidity, oxygen etc. but may be dispensed with depending on the materials employed in the reflective layer 13. Said protective layer 14 may be formed by a coated layer of an organic layer, or by evaporation of an inorganic or metallic materials such as oxide (SiO, $SiO_2$ etc.) or nitride ($Si_3N_4$ etc.).

Figure 4:
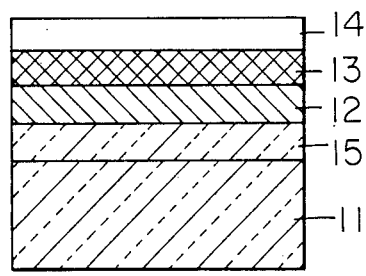
FIG. 4 is a schematic cross-sectional view showing a second embodiment of the present opto-magnetic recording medium.
Figure 5:
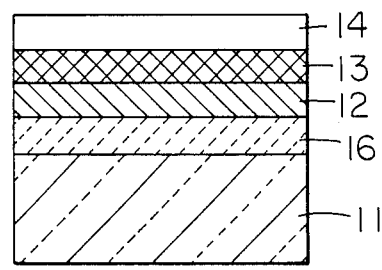
FIG. 5 is a schematic cross-sectional view showing a third embodiment of the present opto-magnetic recording medium.

The opto-magnetic recording medium of the present invention may be provided further with an auxiliary layer or layers. For example, between the translucent substrate 11 and the magnetic recording layer 12 shown in FIG. 1, there may be provided an anti-reflection layer or a heat insulating layer composed for example of an organic polymer of a low thermal conductivity. In FIG. 4, a heat insulating layer 15 is interposed between translucent substrate 11 and magnetic recording layer 12. In FIG. 5, an anti-reflection layer 16 is spaced between translucent substrate 11 and magnetic recording layer 12. Also there may be further provided a layer including index marks or tracking marks. Furthermore there may be provided a transparent heat insulating layer between the magnetic recording layer 12 and the reflective layer. Furthermore it is possible to prepare a medium allowing information recording on both sides by adhering two magneto-optical recording media of the present invention with the reflective layers thereof positioned inside.

The present invention will be clarified further by examples shown in the following.

EXAMPLE 1

(reference example)

An opto-magnetic recording medium was prepared in the following manner. A smooth glass substrate of a diameter of 120 mm and a thickness of 1.5 mm was cleaned, and a settable silicone resin (SR-2410 manufactured by Toray Silicone Co.) was applied on a face with a spinner so as to obtain a dry thickness of 0.5 microns. The drying was conducted for 2 hours at 150° C. The silicone resin was applied to avoid the dissipation of heat generated by beam irradiation on the magnetic recording layer.

Then, on the surface of said silicone resin layer, there was formed an anti-reflecting layer by electron beam evaporation of silicon monoxide (SiO, purity 99.9%) with a thickness to provide a minimum reflectivity. Said thickness is about 0.1 μm, which is obtained by dividing the wavelength, 820 nm, of a currently employed GaAsAl semiconductor laser with the quadraple of the refractive index of silicon monoxide. Subsequently an amorphous layer having a composition of $Fe_{0.76}GD_{0.12}Tb_{0.12}$ was sputtered as the magnetic recording layer with a thickness of 0.02 μm, and silicon monoxide (SiO, purity 99.9%) was deposited by electron beam evaporation as the protective layer with a thickness of 0.3 μm. The magneto-optical recording medium thus prepared was subjected to pit recording and signal reproduction through the glass substrate in combination with optical heads. The recording optical head was equipped with a semiconductor laser of 20 mW (wavelength 820 nm) as the light source to form a small light spot having the diameter of about 1.2 μm on the surface of the recording layer. Also an electromagnet was so positioned as to apply a magnetic field perpendicular to the surface of the recording layer. The disk-shaped magneto-optical recording medium was rotated to uniformly magnetize the recording layer, and the laser was pulse oscillated to record a signal of 5 MHz as pits. The recorded signal was read by irradiating the recording layer with a semiconductor laser of 10 mW in the same manner as in signal recording, and the reflected light was detected through an analyzer. The reproduced signal provided a C/N ratio (S/N ratio at the central frequency bandwidth of the signal) of 24 dB.

EXAMPLES 2-5

(comparison examples)

A recording layer of a composition by co-sputtering of a low-absorbing material ($M_{II}$) and a high-reflecting material ($M_I$) as listed in Tab. 1, of which composition is represented by the atomic percentage x in a formula $M_{Ix}M_{II1-x}$ of the reflective layer. On said reflective layer there was formed a protective layer of silicon monoxide with a thickness of 0.3 μm.

Then the record-reproducing characteristics, represented by the C/N ratio of the reproduced signal, of these samples were measured in the following manner. The signal was recorded in the same manner as described in the Example 1, with a laser output of 7 mW on the surface of the recording medium. The recorded signal was a pulse signal of 5 MHz with a duty ratio of 50%. The reproducing laser was of an output of 2 mW on the surface of the recording medium, and the C/N ratio was measured at a band width of 30 KHz. The obtained C/N ratios, which are considered to represent both the dimension of recorded pit or the recording sensitivity and the magnitude of the magneto-optical effect of the recording medium, are summarized in Tab. 1.

STORAGE TEST

The recording media prepared in the Examples 1-21 were subjected to a storage test under a condition of a temperature of 45° C. and a relative humidity of 95%, and then to the measurement of the C/N value in the signal recording and reproduction under the same condition as described before. The obtained results are summarized in the last column of Tab. 1.

TABLE 1

| Example | Reflective layer | | Composition x in $M_{Ix}M_{II1-x}$ | Reflective layer thickness (Å) | C/N ratio (dB) | C/N ratio after storage test (dB) |
| --- | --- | --- | --- | --- | --- | --- |
| | High-reflecting layer $M_I$ | Low-absorbing layer $M_{II}$ | | | | |
| 1 (ref.ex.) | — | — | — | — | 24 | 20 |
| 2 (ref.ex.) | Cu | — | 1.00 | 600 | 36 | 28 |
| 3 (ref.ex.) | Ag | — | 1.00 | 600 | 36 | 28 |
| 4 (ref.ex.) | Au | — | 1.00 | 600 | 37 | 29 |
| 5 (ref.ex.) | Al | — | 1.00 | 600 | 28 | 25 |
| 6 (pres. inven.) | Cu | $MgF_2$ | 0.85 | 900 | 39 | 33 |
| 7 " | Cu | $CaF_2$ | 0.85 | 900 | 39 | 33 |
| 8 " | Cu | $Bi_2O_3$ | 0.90 | 900 | 36 | 30 |
| 9 " | Cu | ZnS | 0.90 | 900 | 38 | 30 |
| 10 " | Ag | LiF | 0.85 | 900 | 39 | 30 |
| 11 " | Ag | $SiO_2$ | 0.85 | 900 | 38 | 33 |
| 12 " | Ag | SiO | 0.90 | 900 | 40 | 36 |
| 13 " | Ag | $CeO_2$ | 0.90 | 900 | 37 | 30 |
| 14 " | Au | NaF | 0.85 | 900 | 38 | 34 |
| 15 " | Au | $CaO.SiO_2$ | 0.85 | 900 | 40 | 34 |
| 16 " | Au | $WO_3$ | 0.90 | 900 | 39 | 28 |
| 17 " | Au | $TiO_2$ | 0.90 | 900 | 39 | 25 |
| 18 " | Al | $3NaF.AlF_3$ | 0.85 | 900 | 37 | 31 |
| 19 " | Al | $Al_2O_3$ | 0.85 | 900 | 34 | 30 |
| 20 " | Al | $Sb_2O_3$ | 0.90 | 900 | 34 | 20 |
| 21 " | Al | $Sb_2S_3$ | 0.90 | 900 | 37 | 31 |

$Fe_{0.76}Gd_{0.12}Tb_{0.12}$ formed as described in the Example 1 was provided thereon with a reflective metal layer of varying compositions as shown in Tab. 1 and further with a protective layer of silicon monoxide of a thickness of 0.3 μm. The signal recording and reproduction in the same manner as described in the Example 1 on the recording media thus prepared provided C/N values in the reproduced signal as shown in Tab. 1.

EXAMPLES 6-21

(present invention)

A recording layer of a composition of $Fe_{0.76}Gd_{0.12}Tb_{0.12}$ formed as described in the Example 1 was provided thereon with a reflective layer formed As will be apparent from Tab. 1, the opto-magnetic recording medium of the present invention shows superior record-reproducing characteristic and stability in storage compared to those of the conventional medium without the reflective layer or having a metal reflective layer.

We claim:

1. An opto-magnetic recording medium comprising:
   a recording layer composed of a magnetic layer having a characteristic in which the magnetic layer is easily magnetized in a direction perpendicular to the surface of the layer; and a reflective layer positioned on said recording layer and composed of a mixture of a reflective metal and a low light absorbing dielectric material.

2. An opto-magnetic recording medium according to claim 1 wherein said low light absorbing dielectric material is selected from the group consisting of metallic or semi-metallic oxides, fluorides, sulfides or iodides and organic macromolecular materials.

3. An opto-magnetic recording medium according to claim 1, wherein, in said reflective layer, said reflective metal represents a content in a range of 80 to 95 atomic % in the entire mixture.

4. An opto-magnetic recording medium according to claim 1, wherein said reflective layer has a thickness in a range from 700 to 3,000 Å.

5. An opto-magnetic recording medium according to claim 1, wherein said reflective layer is a co-evaporated layer of the reflective metal and the low light absorbing dielectric material.

6. An opto-magnetic recording medium according to claim 1, wherein said recording layer is composed of an amorphous rare earth-transition metal alloy layer.

7. An opto-magnetic recording medium according to claim 1, wherein said recording layer has a thickness in a range from 100 to 1,000 Å.

8. An opto-magnetic recording medium according to claim 1, comprising, in sequence, a translucent substrate, said recording layer and said reflective layer.

9. An opto-magnetic recording medium according to claim 8, further comprising a protective layer on said translucent substrate on a face thereof opposite to said reflective layer.

10. An opto-magnetic recording medium according to claim 8, further comprising a heat insulating layer between said translucent substrate and said recording layer.

11. An opto-magnetic recording medium according to claim 8, further comprising an anti-reflection layer between said translucent substrate and said recording layer.

* * * * *